T. HERSEE, Jr.
Thill-Coupling.
No. 64,865.
Patented May 21, 1867.
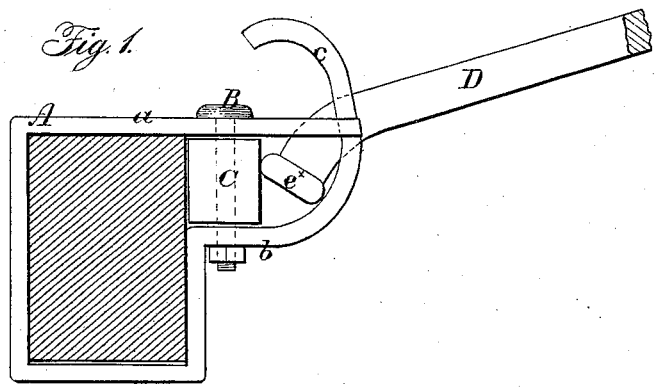
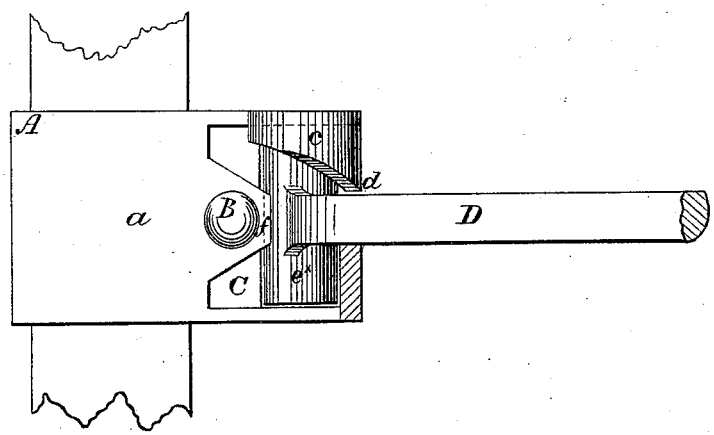
Witnesses:
Theo Tusche
Wm Trewin
Inventor:
Thompson Hersee jr
Per Munn & Co
Attorneys

United States Patent Office.

THOMPSON HERSEE, JR., OF BUFFALO, NEW YORK.

Letters Patent No. 64,865, dated May 21, 1867.

---

IMPROVEMENT IN ATTACHING THILLS TO VEHICLES.

---

The Schedule referred to in these Letters Patent and making part of the same.

---

TO ALL WHOM IT MAY CONCERN:

Be it known that I, THOMPSON HERSEE, Jr., of Buffalo, in the county of Erie, and State of New York, have invented a new and improved Thill-Coupling; and I do hereby declare that the following is a full, clear, and exact description thereof, which will enable others skilled in the art to make and use the same, reference being had to the accompanying drawings, forming part of this specification.

This invention relates to a new and improved coupling for connecting thills to wheel vehicles and sleighs, and it consists in constructing a clip with a curved, forked, or notched plate, and with a chamber or recess to receive a piece of India rubber or other suitable elastic material, and also to receive a cross-bar or cross-head at the outer end of the thill-iron, as hereinafter fully shown and described, whereby thills may be attached to vehicles, and also detached therefrom with the greatest facility, and all rattling and unnecessary play, as well as undue wear and tear of the coupling avoided. In the accompanying sheet of drawings—

Figure 1 represents a side view of my invention.

Figure 2 a plan or top view of the same, partly in section.

Similar letters of reference indicate like parts.

A represents a clip, which is constructed of an iron bar of suitable width, bent or cast so as to encompass the front axle and fit snugly thereon, the top, bottom, and rear sides being all snugly in contact with the axle, as well as the lower portion of the front side. The top portion $a$ of the clip projects or extends in front of the axle, and the front side $b$, above the portion that is in contact with the front side of the axle, also projects in front of the axle, and extends upward above the top portion $a$, and is curved backward towards the axle, as shown at $c$. This top portion $c$ is notched in v-form, as shown at $d$, and an aperture, $e$, is made in the top portion $a$, as shown clearly in fig. 2, a projection, $f$, being at the rear part of the aperture, through which and the lower part of the front portion or side $b$, a screw-bolt, B, passes, said bolt passing through and securing a piece of India rubber, C, between $c$ and $b$, as shown clearly in fig. 1. D represents the thill-iron, which is bolted or screwed to the rear end of the thill, as usual. This thill-iron is made with a cross-head, $a^*$, of such a length that it may be inserted through the aperture $e$ behind the forked plate $c$, and below the projection $f$. This cross-head $e^*$ is of flat form in its transverse section, and its rear edge, when the thill is elevated or in use, bears against the rubber C, and its front edge against the inner surface of $b$, the rear edge of the cross-head, when the thill is thus elevated, being underneath the projection $f$, so that the cross-head cannot casually rise and become disengaged when the thill is in use, or a horse harnessed to a vehicle between the thills connected thereto. When the thills are not in use, and their front ends lowered, the rear edges of the cross-heads $e^*$ will be in front of the projections $f$, and the thills may then readily be detached by lifting the cross-heads directly up out of the clips. The rubber C prevents any play of the cross-heads $e^*$ in the clips, and at the same time causes the clips to fit snugly on the axle.

The advantage of this invention consists, first, in the facility with which the thills may be attached to and detached from the vehicle; second, the impossibility of the thills becoming casually detached from the axle; and, third, the avoidance of play and rattling of the coupling, and consequent unnecessary wear and tear.

This clip may be constructed of wrought or malleable cast iron. The thill-iron may be of wrought iron.

Having thus described my invention, I claim as new, and desire to secure by Letters Patent—

A thill-coupling composed of a clip, A, so constructed as to have a chamber in its front part to receive a piece of India rubber or other elastic substance, C, and also to receive the cross-head $e$ of the thill-iron D, the front plate $c$ of the chamber being notched or forked at its upper end, and the top plate $a$ of the clip over the chamber having an aperture made in it to allow the cross-head of the thill-iron to pass into the chamber, with a projection, $f$, to serve as a guard to prevent the casual rising of the cross-head $e$, substantially as shown and described.

THOMPSON HERSEE, JR.

Witnesses:
JACOB GROMLIT,
JACOB J. WELLER.